Figure 1:
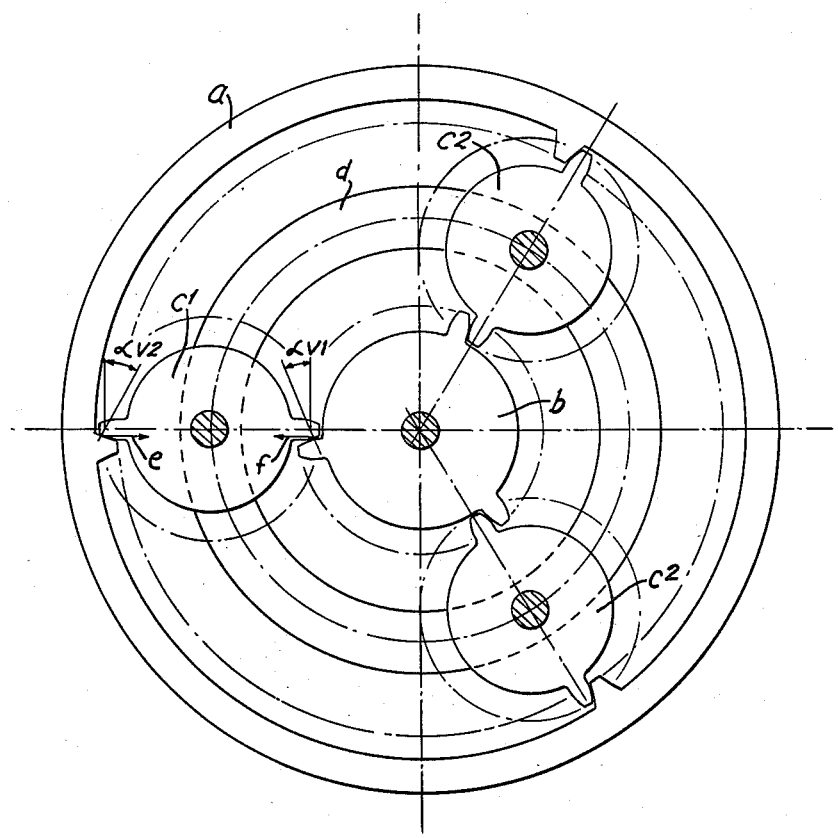

Jan. 26, 1960    H. M. HIERSIG ET AL    2,922,321
DIFFERENTIAL GEARING

Filed Jan. 18, 1957    3 Sheets-Sheet 1

INVENTORS
Heinz Max Hiersig
and Klaus Häuspen
BY
Michael S. Striker
Attorney

INVENTORS
Heinz Max Hiersig
and Klaus Hauser
BY
Michael S. Striker
Attorney

United States Patent Office 2,922,321
Patented Jan. 26, 1960

2,922,321

DIFFERENTIAL GEARING

Heinz Max Hiersig and Klaus Hansgen, Dusseldorf, Germany, assignors to Eisenwerke Mulheim/Meiderich Aktiengesellschaft, Mulheim (Ruhr), Germany Application January 18, 1957, Serial No. 634,933

6 Claims. (Cl. 74—801)

The present invention relates to differential gearing arrangements.

As is well known, it is impossible to manufacture a conventional differential gearing arrangement with a degree of precision which is high enough to guarantee that the load is uniformly distributed among the planetary gears of the differential gearing arrangement. The teeth of one of the planetary gears may be somewhat different from the teeth of the other planetary gears, or the structure which supports the planetary gears for rotation about their axes, respectively, may be such that one planetary gear is loaded to a greater extent than the others.

One of the objects of the present invention is to provide a differential gearing arrangement which automatically compensates for unavoidable differences in the construction of the parts of the differential gearing arrangement in such a way that the planetary gears are uniformly loaded.

Another object of the present invention is to provide a differential gearing arrangement wherein automatic compensation providing uniform loading of the planetary gears is provided with an extremely simple structure which is far less complex and far less expensive than conventional structures for compensating for different loads which might occur on the several planetary gears and which at the same time is very reliable in operation.

With the above objects in view, the present invention mainly consists of a differential gearing arrangement which includes a plurality of differential gears distributed about a given axis. A pair of additional gears respectively mesh with opposed parts of the planetary gears, and these additional gears have a common axis of rotation about which the planetary gears are distributed. The pressure angle between the teeth of the planetary gears and one of these additional gears is different from the pressure angle between the teeth of the planetary gears and the other of the additional gears, and a means supports the planetary gears for free rotation about their axes as well as for turning movement about the common axis of the additional gears in such a way that this means which supports the planetary gears is freely shiftable together with the planetary gears in a plane normal to the common axis of the two additional gears.

Figure 2:
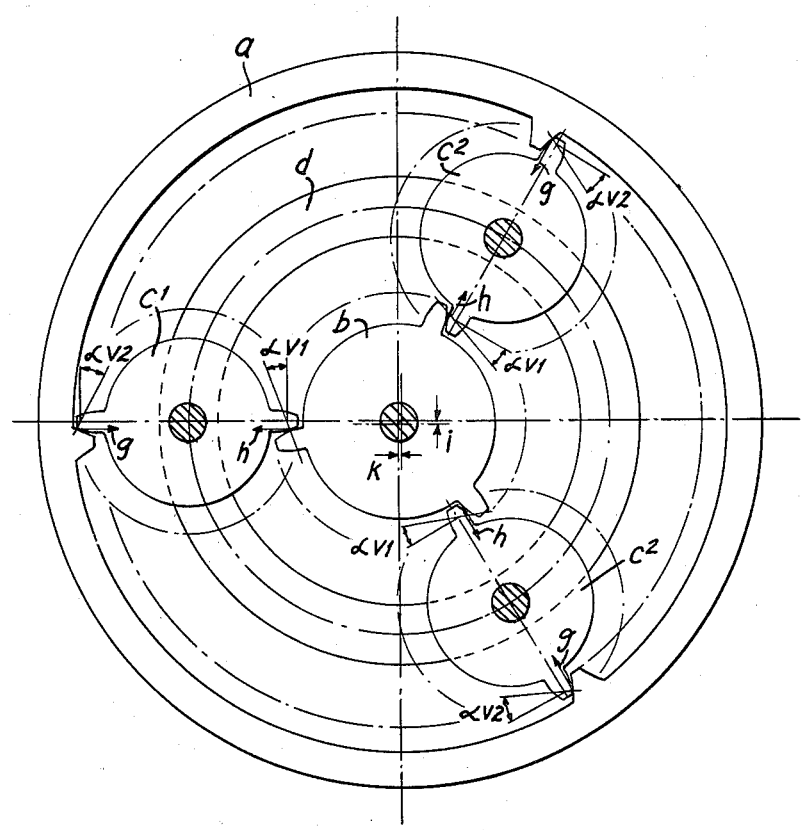
Figure 3:
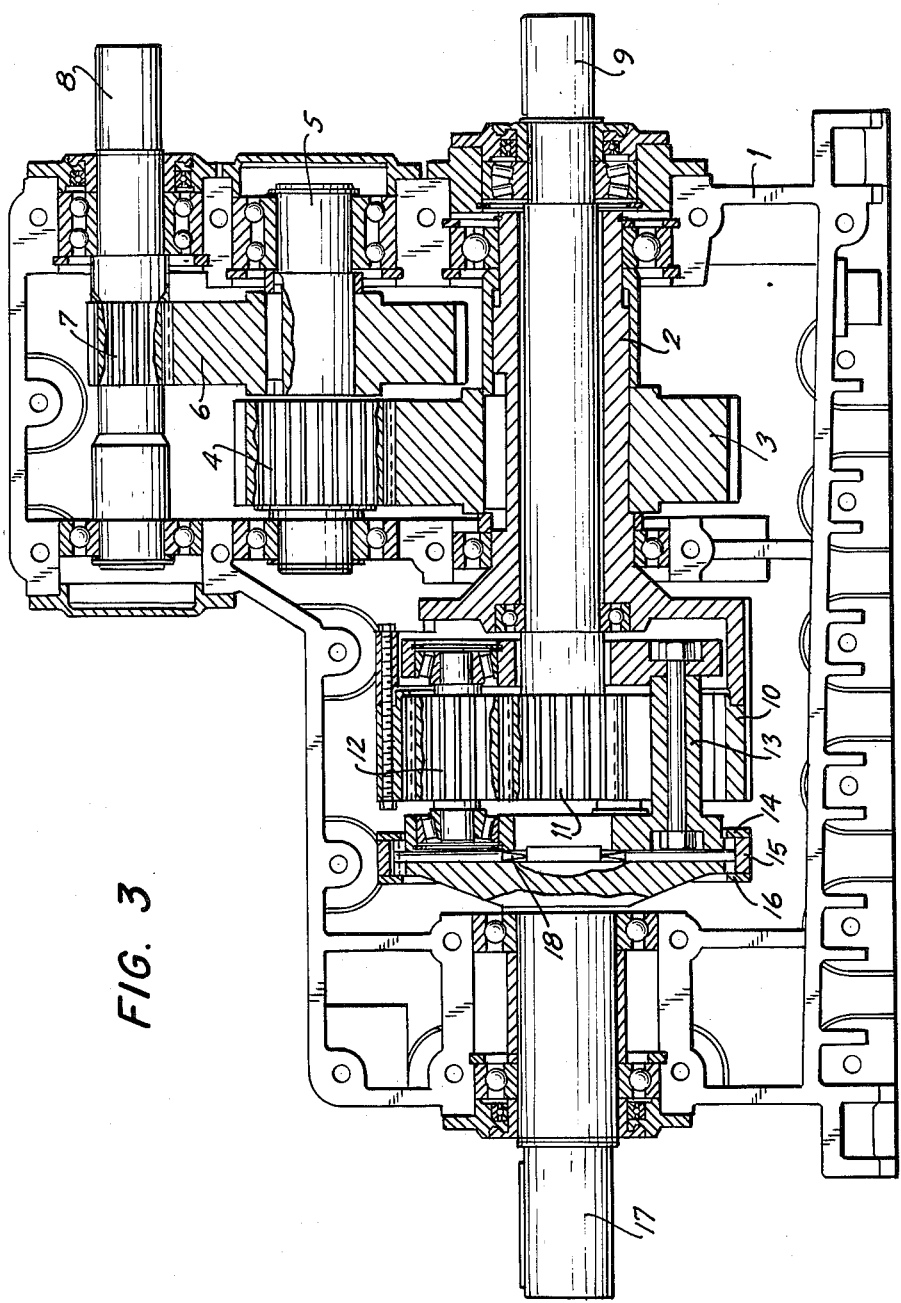

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 diagrammatically illustrates the structure of the invention when the differential gearing arrangement starts its operation;

Fig. 2 diagrammatically illustrates the structure of Fig. 1 after the operation of the differential gearing arrangement has started and after compensation has taken place so that the planetary gears are all uniformly loaded; and Fig. 3 is a sectional elevational view showing a structure for combining a pair of drives and including the differential gearing arrangement of the invention.

Referring to Figs. 1 and 2, it will be seen that the differential gearing arrangement of the invention includes an external gear $a$ in the form of an annular ring gear having inner teeth, and the differential gearing arrangement of the invention also includes an internal or sun gear $b$ in the form of a spur gear. A plurality of planetary gears $c^1$ and $c^2$ are distributed about the common axis of the gears $a$ and $b$ and are located between these gears so that the gears $a$ and $b$ respectively mesh with opposed parts of the planetary gears $c^1$ and $c^2$. These planetary gears are supported for free rotation about their respective axes by a suitable means which takes the form of a ring $d$ having a plurality of pins fixed thereto and extending parallel to the axis of the ring $d$ which is substantially coincident with the axis of the internal gear $b$. These pins pass through central openings of the planetary gears to support the latter for rotation, respectively, and with this arrangement the planetary gears are supported in such a way that they can rotate about their own axes, respectively, as well as turn about the common axis of the gears $a$ and $b$. Furthermore, it will be noted that the support means $d$ as well as the planetary gears are free to shift in a plane normal to the common axis of the gears $a$ and $b$.

In accordance with the present invention the profiles of the teeth of the external gear $a$ are different from the profiles of the teeth of the internal gear $b$, and the result of the different profiles of the teeth of the gears $a$ and $b$ is such that these different profiles can effect a shifting movement of the planetary gears, as will be apparent from the description which follows. The different profiles of the gears $a$ and $b$ provide different pressure angles with the teeth of the planetary gears, and as may be seen from Fig. 1, the pressure angle $\alpha_{v2}$ between the teeth of the gear $a$ with the teeth of the planetary gears $c^1$ and $c^2$ is greater than the pressure angle $\alpha_{v1}$ between the teeth of the gear $b$ and the teeth of the planetary gears. It is emphasized that the example of Fig. 1 is presented only by way of illustration. It is equally possible in accordance with the present invention to have the pressure angle between the teeth of the inner gear $b$ and the teeth of the planetary gears greater than the pressure angle between the teeth of the external gear $a$ and planetary gears. In the example illustrated in Fig. 1, it is evident that the greater pressure angle between the teeth of the gear $a$ and the teeth of the planetary gears will produce an inwardly directed radial thrust $e$ which is greater than the outwardly directed radial trust $f$ resulting from the engagement between the teeth of the planetary gears and the teeth of the internal gear $b$.

With respect to Fig. 1, let it be assumed that the teeth of the planetary gear $c^1$ are thicker than the teeth of the planetary gear $c^2$, so that when the differential gearing arrangement illustrated in Fig. 1 is started, only the planetary gear $c^1$ is in driving engagement with the gears $a$ and $b$. As a result, when the differential gearing arrangement is started the radial components $e$ and $f$ shown in Fig. 1 will act on the planetary gear $c^1$, and since the force $e$ is greater than the force $f$ a differential force resulting from the difference between the forces $e$ and $f$ will act on the gear $c^1$ to shift the latter inwardly toward the axis of the internal gear $b$, and as a result the entire assembly of the planetary gears together with the support means $d$ will be shifted so that the planetary gears $c^2$ also come into driving engagement with the gears $a$ and $b$. The shifting continues until all of the planetary gears have an inwardly directed thrust acting on them which is greater than the outwardly acting thrusts by equal amounts. Thus, referring to Fig. 2 which shows the differential gearing arrangement after the automatic compensation has been completed, all of the planetary gears due to the engagement of their teeth with the teeth of the gear $a$ are acted on by an inwardly directed radial thrust $g$, and at the same time the planetary gears cooperate with the teeth of the internal gear $b$ so as to be acted upon by an outwardly directed radial thrust $h$. In the example illustrated the inwardly directed thrusts $g$ are greater than the outwardly directed thrusts $h$ and in the case of all of the planetary gears the differences between the forces $g$ and $h$ are equal, so that in this way all of the planetary gears are uniformly loaded. It will be noted from a comparison of Fig. 1 and Fig. 2 that the axis of the ring $d$ has shifted with respect to the axis of the internal gear $b$ to the right by a distance $k$ and downwardly by a distance $i$. Compensation automatically occurs in the same way to produce uniform loading of the planetary gears in the case where the pressure angle between the planetary gears and the teeth of the internal gear is greater than the pressure angle between the teeth of the planetary gears and the external gear.

The planetary gears as well as the gears $a$ and $b$ are conventional involute gears. The different pressure angles between the gear $a$ and the planetary gears, on the one hand, and the gear $b$ and the planetary gears is obtained in a well known manner. Thus, it is well known that a pair of involute gears which mesh with each other have their axes located normally at a predetermined distance from each other. However, a characteristic of involute gears, as is well known, is that these gears can cooperate properly even though the distance between the axes of a pair of meshing involute gears is changed. Thus, if the pair of axes of a pair of meshing involute gears are moved apart from each other it is well known that the gears will still cooperate properly while the pressure angle will be increased. Thus, in the case of the example illustrated in Figs. 1 and 2 the axes of the planetary gears are located closer to the axis of the gear $a$ than would normally be the case in order to provide the greater pressure angle between the gear $a$ and the planetary gears so as to provide the radial thrust $e$ which is greater than the radial thrust $f$. If it were desired to provide a radial thrust $f$ greater than the radial thrust $e$, then the axes of the planetary gears would be located further away from the axis of the gear $b$. Of course, when the distance between the axes of a pair of meshing involute gears is changed so as to provide a greater pressure angle by increasing the distance between these axes, the result will be a greater play or backlash between the gears. To avoid this greater backlash while still retaining the greater pressure angle it is only necessary to make the teeth of one of the gears thicker in a circumferential direction, and it will be noted from Figs. 1 and 2 that the teeth of the gear $a$ are in fact thicker in a circumferential direction than the teeth of the gear $b$, so that this fact accounts for the difference in the profile between the gear $a$ and the gear $b$. Both of these gears are involute gears, but the teeth of the gear $a$ are larger in a circumferential direction so as to eliminate the backlash which would have resulted if the axes of the planetary gears were shifted with respect to the gear $a$ so as to obtain the greater pressure angle and no steps were taken to avoid the increased backlash. Of course, in the case of Figs. 1 and 2 the greater pressure angle is obtained between the gear $a$ and the planetary gears by shifting the latter towards the axis of the gear $a$ since the latter gear is an internal ring gear. The gear $b$ is simply a conventional involute gear having a diameter which cooperates properly with the planetary gears after the latter have been shifted so as to provide the greater pressure angle in the well known manner described above. Of course, the axes of the planetary gears could also be located closer than normal to the axis of the gear $b$ so as to provide a smaller pressure angle between the gear $b$ and the planetary gears, as compared with the pressure angle between the planetary gears and the outer gear $a$, and this result would only require further cutting of the teeth of the gear $b$ so that the spaces between the teeth extend to a greater radial distance toward the axis of the gear $b$, and the tips of the teeth of the gear $b$ could then be correspondingly cut off to provide proper cooperation between the gear $b$ and the planetary gears. Furthermore, it is clearly possible to obtain the different pressure angles by a combination of shifting the axes of the planetary gears toward the axis of the gears $a$ and $b$ so as to provide a larger pressure angle with the gear $a$ and a smaller pressure angle with $b$, the teeth of the gear $a$ being made larger in a circumferential direction to eliminate the backlash and the teeth of the gear $b$ being cut somewhat deeper to provide the smaller pressure angle. Any one of the above possibilities can be used to provide the different pressure angles, and all of these possibilities are well known, although the use of the different pressure angles in the combination of the present invention to provide equal loading of the planetary gears of a differential gear assembly is new and provides in an extremely simple way a structure which guarantees uniform loading of the planetary gears in the above-described manner.

Fig. 3 of the drawings shows the differential gearing arrangement of the invention as used in an assembly for combining a given constant speed drive with a given variable speed drive, where this variable speed drive may, for example, be steplessly varied. Referring to Fig. 3, it will be seen that an elongated hollow shaft 2 is rotatably supported for rotation about its axis on the housing 1. A gear 3 is fixed to the hollow shaft 2 and meshes with a gear 4 which is fixed to an intermediate shaft 5 parallel to the hollow shaft 2 and also supported for rotation about its axis. The shaft 5 fixedly carries a gear 6 which meshes with a gear 7 fixed to a drive shaft 8 supported for rotation about its axis in the housing 1, and this drive shaft 8 may be rotated by a motor whose speed may be adjusted or through a steplessly variable drive in such a way that the speed of rotation of the shaft 8 may vary.

A shaft 9 extends through and is freely turnable with respect to the hollow shaft 2, and this shaft 9 is driven at a constant speed of rotation by any suitable motor or the like. If desired, the shafts 8 and 9 may be driven from a constant motor with a suitable transmission interposed between the motor and the shaft 8 to enable the latter to have its speed varied in a stepless manner, if desired, as mentioned above.

The hollow shaft 2 is fixed to the external gear 10 of the differential arrangement of the invention, this gear 10 being in the form of an annular ring gear having internal teeth. The shaft 9 is fixed to the internal gear 11 which is the sun gear of the differential arrangement of the invention. The planetary gears 12 are distributed about the axis of gear 11 and mesh with the gear 11 as well as with the gear 10. These planetary gears 12 are supported for rotation about their respective axes by a support means in the form of a spider 13 which is freely shiftable in a direction perpendicular to the axis of the gear 11. As may be seen from Fig. 3, the support means 13 is in the form of a ring having a plurality of pins affixed to and extending to the right therefrom and respectively carrying the planetary gears 12.

The outer periphery of the support means 13 at the left end thereof, as viewed in Fig. 3, is fixed to a gear 14 as by being formed integrally therewith, and this gear 14 serves only to transmit the turning of the planetary gears about the axis of the gear 11 resulting from the difference between the turning moments of the gears 10 and 11 with respect to each other. The teeth of the gear 14 mesh loosely with the teeth of an internal ring gear 15 which also meshes with the teeth of a gear 16 affixed to the right end of the driven shaft 17 which is supported for rotation about its axis in the housing 1. A spring 18 which may be in the form of a pair of opposed annular dished spring members is located between the gear 16 and the support means 13 to resiliently oppose axial shifting of the support means 13. All of the shafts of the structure shown in Fig. 1 as well as the planetary gears are preferably supported for rotation by roller bearings.

Because of the fact that with the structure shown in Fig. 3 the drive will be subject to impulses during changes in the speed of the drive, it is preferred to make the pressure angle between the teeth of the internal gear 11 with the teeth of the planetary gears 12 greater than the pressure angle between the teeth of the gear 10 with the teeth of the planetary gears 12. In this way, the teeth of the gear 11 will be very strong at their bases and will thus be able to withstand the impulses to which the differential drive is subjected. Thus, with this arrangement should the load be non-uniformly distributed among the planetary gears at any time, the planetary gears supporting means 13 together with the planetary gears 12 will automatically shift in a direction which will automatically compensate for the unequal distribution of the load and which will provide an equal distribution of the load among all of the planetary gears 12.

In the case where impulse loading of the differential arrangement is not an important factor to consider, as where the elements are required to rotate at high speeds, it is preferred to construct the differential gearing arrangement as shown in Figs. 1 and 2 where the pressure angle between the teeth of the external gear $a$ and the teeth of the planetary gears is greater than the pressure angle between the teeth of the internal gear $b$ and the teeth of the planetary gears, because in this way the teeth with the greater bases may be located at the external gear which is of a larger diameter so that the greater teeth can be more easily accommodated in the available space.

It will be noted that with the structure of the invention the desired compensation is automatically obtained with an exceedingly simple arrangement which includes but a single internal gear $b$ as well as a single set of planetary gears and a support means therefor.

It will be understood that each of the elements described above, or two or more together, may also find a useful application in other types of differential gearing arrangements differing from the types described above.

While the invention has been illustrated and described as embodied in automatically compensating differential gearing arrangements, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A differential gearing arrangement comprising, in combination, a plurality of planetary gears distributed about a given axis; a pair of additional gears respectively meshing with opposed parts of said planetary gears, said pair of additional gears being coaxial and said planetary gears being distributed about the common axis of said pair of additional gears, the pressure angle between the teeth of said planetary gears and the teeth of one of said additional gears being greater than the pressure angle between the teeth of said planetary gears and the teeth of the other of said additional gears; and means supporting said planetary gears for free rotation about their own axes, respectively, as well as for turning movement about the common axis of said pair of additional gears, said latter means being itself freely shiftable together with said planetary gears in a plane normal to the common axis of said pair of additional gears.

2. A differential gearing arrangement comprising, in combination, an internal gear having a predetermined axis of rotation; a plurality of planetary gears distributed about and meshing with said internal gear; an external annular gear having inner teeth meshing with said planetary gears, the pressure angle between the teeth of said planetary gears and the teeth of said external gear being different from the pressure angle between the teeth of said planetary gears and the teeth of said internal gear; and means supporting said planetary gears for free rotation about their axes, respectively, and said latter means together with said planetary gears being freely shiftable in a plane normal to the axis of said internal gear.

3. A differential gearing arrangement as recited in claim 2 and wherein the pressure angle between the teeth of said external gear and the teeth of said planetary gears is greater than the pressure angle between the teeth of said internal gear and the teeth of said planetary gears.

4. A differential gearing arrangement as recited in claim 2 and wherein the pressure angle between the teeth of said internal gear and the teeth of said planetary gears is greater than the pressure angle between the teeth of said external gear and the teeth of said planetary gears.

5. A differential gearing arrangement comprising, in combination, an internal gear having a predetermined axis of rotation; a plurality of planetary gears distributed about and meshing with said internal gear; an external annular gear having inner teeth meshing with said planetary gears, the pressure angle between the teeth of said planetary gears and the teeth of said external gear being different from the pressure angle between the teeth of said planetary gears and the teeth of said internal gear; means supporting said planetary gears for free rotation about their axes, respectively, and said latter means together with said planetary gears being freely shiftable in a plane normal to the axis of said internal gear; and spring means cooperating with said means supporting said planetary gears for yieldably resisting axial movement of said means supporting said planetary gears.

6. A differential gearing arrangement comprising, in combination, an internal gear having a predetermined axis of rotation; a plurality of planetary gears distributed about and meshing with said internal gear; an external annular gear having inner teeth meshing with said planetary gears, the pressure angle between the teeth of said planetary gears and the teeth of said external gear being different from the pressure angle between the teeth of said planetary gears and the teeth of said internal gear; means supporting said planetary gears for free rotation about their axes, respectively, and said latter means together with said planetary gears being freely shiftable in a plane normal to the axis of said internal gear; a pair of drive shafts respectively rotatable at different speeds of rotation; means transmitting the drive from one of said drive shafts to said external gear; means transmitting the drive from the other of said drive shafts to said internal gear; and a driven shaft operatively connected to said means supporting said planetary gears to rotate said driven shaft together with said planetary gears about the axis of said internal gear, whereby said driven shaft rotates with a speed which results from the combination of the two different speeds of rotation of the first and second drive shafts.

References Cited in the file of this patent
UNITED STATES PATENTS

| | | |
|---|---|---|
| 2,043,261 | Neuland | June 9, 1936 |
| 2,501,034 | Derbyshire | Mar. 21, 1950 |
| 2,703,021 | Stoeckicht | Mar. 1, 1955 |
| 2,801,552 | Stubbings et al. | Aug. 6, 1957 |